Oct. 19, 1954
H. M. CRANE
2,692,135
SPRING MOUNTING STRUCTURE
Filed April 6, 1951
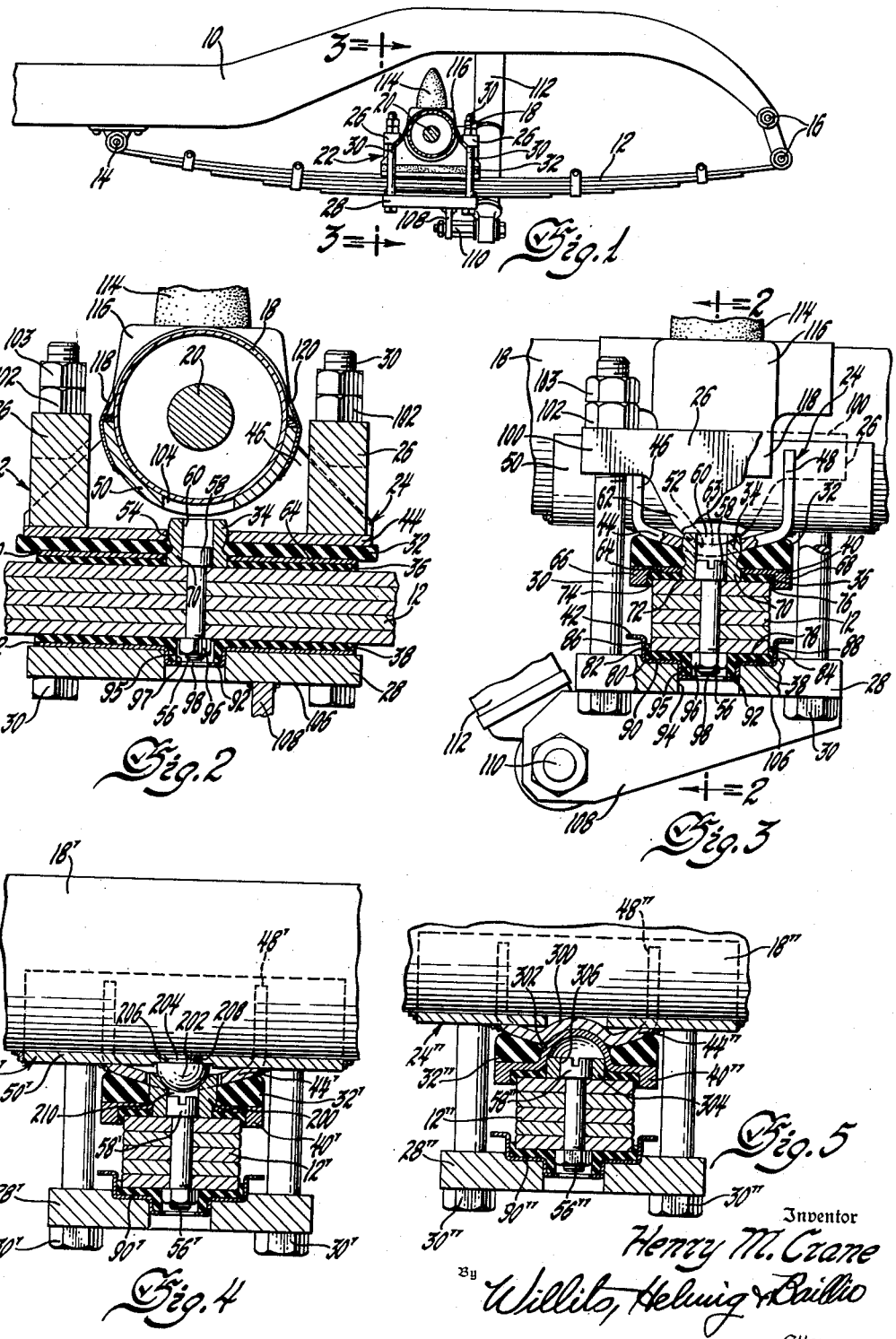
Inventor
Henry M. Crane
By Willits, Helwig & Baillio
Attorneys Patented Oct. 19, 1954

2,692,135

UNITED STATES PATENT OFFICE 2,692,135

SPRING MOUNTING STRUCTURE

Henry M. Crane, New York, N. Y., assignor to General Motors Corporation, Detroit, Mich., a corporation of Delaware Application April 6, 1951, Serial No. 219,626

16 Claims. (Cl. 267—52)

This invention relates to mounting devices for load supporting or suspension springs and more particularly to devices for flexibly and resiliently mounting such springs on the axle housings of motor vehicles.

During operation of motor vehicles, especially over uneven or bumpy roads and during turning thereof in either direction the suspension springs thereof are at times subjected to abnormally great lateral, fore and aft and torsional stresses. The devices employed heretofore for mounting suspension springs of the multiple leaf type on axle housings of motor vehicles rigidly secure them in position and therefore substantially all of the varied forces imposed thereon during operation of the said vehicle are absorbed by the said springs themselves. Because of the twisting of springs during operation of the vehicle such mountings frequently cause binding of the leaves thereof as well as deformation, and thereby causing changes to take place in the basic rate, friction and stress characteristics of said springs. This results in impairing the ride qualities of the vehicle and also in causing undesirable noises to occur and even eventual failure of the springs.

One object of my invention is to provide a novel and highly improved mounting structure for load supporting springs which reduces to a minimum the above referred to undesirable features of prior structures.

Another object is to provide a novel structure for mounting load supporting or suspension springs on the axle housings of motor vehicles which minimizes or prevents changes from taking place in the basic rate, friction and stress characteristics of such springs.

A further object is to provide means for mounting a leaf spring on the axle housing of a motor vehicle in such a manner that the said spring may rock relative to said housing without causing the axle housing to lose any of its lateral, fore and aft, or torsional control.

A still further object is to provide a device for flexibly and resiliently mounting a multiple leaf load supporting spring on the underside of the axle housing of a motor vehicle which provides a point of rocking movement between the spring and housing as near the top of the spring as possible, thereby insuring proper operation of said spring and housing under all operating conditions.

A more specific object is to provide a device for mounting a multiple leaf suspension spring on the axle housing of a vehicle having pivotal supporting means and a resilient cushioning member disposed between said spring and housing which permit the said housing to operate through its many tramp variations with a minimum of torsional or other deformation of said spring.

A still further object is to provide a device for mounting a multiple leaf type of spring on an axle housing which is simple in structure, economic in manufacture and highly efficient in operation.

Other and further objects will become apparent as the description of my invention progresses.

Of the drawings:

Fig. 1 is a side elevational view, partly in section, showing a suspension spring mounted on the frame and axle housing of a vehicle.

Fig. 2 is a sectional view taken substantially along line 2—2 of Fig. 3 showing my improved means for mounting a suspension or load supporting spring on an axle housing.

Fig. 3 is an elevational view, partly in section, taken substantially along line 3—3 of Fig. 1, certain parts being broken away to more clearly show the structure thereof.

Fig. 4 is a sectional view of a modified form of mounting means for suspension or load supporting springs, and Fig. 5 is a similar sectional view of a further modification.

Referring to the drawing the numeral 10 indicates one of the side rails of a vehicle frame having a load supporting or suspension spring 12 mounted thereon in the usual manner by shackle bolt means, as shown at 14 and 16. Spring 12 is of the multiple leaf type and is mounted intermediate its ends on the underside of the housing 18 of the driving axle 20 of a vehicle by my improved mounting means indicated generally at 22.

Mounting means 22 comprises a rocker seat 24, upper and lower clamp members 26, 26 and 28, respectively, clamp bolts 30, rocker pad 32, a centering ball stud 34, upper and lower spring insulators 36 and 38, respectively, and upper and lower spring insulator retainers 40 and 42.

Rocker seat 24 comprises a broad V-shaped substantially horizontally extending spring supporting web portion 44 terminating at its sides in vertically extending truncated triangular side members 46 and 48, and a substantially semi-cylindrical housing engaging and supporting member 50. Side members 46 and 48 are provided with semi-circular recesses in the upper ends thereof for receiving member 50 and are secured to the latter by welding. Member 50 is also secured to housing 18 by welding or by any other suitable means. Web portion 44 is curved at its lower end, as shown at 52, and is provided with an aperture 54 centrally thereof for receiving the centering stud 34. The wall of aperture 54 is curved vertically so as to conform generally with the curvature of stud 34 and in operation acts as a socket about which said stud may pivot.

Suspension spring 12 extends between upper and lower clamp members 26, 26 and 28, and the leaves thereof are secured together intermediate their ends by a spring retaining bolt 56. The head 58 of bolt 56 extends into an opening 60 extending vertically through the center of stud 34 and is adapted for vertical movement therein. Upper clamp members 26, 26 are disposed on either side of housing 18 and each has a downwardly extending curved bearing portion 62. The rounded lower ends 63 of bearing portions 62 engage the upper surface of web 44, as shown in Figs. 2 and 3, and, accordingly, the clamp members 26, 26 and 28, as well as the other elements carried thereby may rock slightly against the action of resilient pad 32, as will appear more fully hereinafter.

Rocker pad 32 may be constructed of any suitable resilient material, such as rubber, and as shown in Figs. 2 and 3, is of rectangular shape and is provided with an opening centrally thereof through which ball stud 34 extends. The upper surface of pad 32, in assembly, is in engagement with substantially the entire under surface of web 44 and extends slightly beyond both ends thereof. The lower surface of pad 32 engages the flat upper surface of upper insulator retainer 40 and is of substantially the same width as the latter but extends a short distance beyond both ends thereof.

Upper retainer 40 is of channel shape construction having a relatively thin web 64 and relatively wide short legs 66 and 68. An opening is provided centrally of web 64 through which the shank 70 of ball stud 34 extends. The shank 70 of stud 34 extends downwardly a short distance below web 64 so as to rest upon the upper surface 72 of spring 12 and when the parts are positioned, as shown in Figs. 2 and 3, the said shank and web are welded or otherwise rigidly secured together. Spring insulators 36 and 38 are constructed of rubber or other sound dampening material and are disposed between spring 12 and the adjacent metal parts to dampen noises usually transmitted to the axle by the vehicle driving mechanism. Upper insulator 36 is of channel shape construction and the upper and lower surfaces thereof engage, respectively, the lower surface of the web 64 of upper retainer 40 and the upper surface 72 of spring 12. The legs 74 and 76 of insulator 36 lie in abutting relation with legs 66 and 68, respectively, of retainer 40 and the upper side edges of spring 12. An opening is provided centrally of insulator 36 through which the shank 70 of ball stud 34 extends.

Lower insulator 38 is also of substantially channel shape construction and lies between the lower surface 78 of spring 12 and the upper surface of the web 80 of retainer 42. The legs 82 and 84 of insulator 38 extend between the inner surfaces of the legs 86 and 88, respectively, of retainer 42 and the lower side edges of spring 12. Retainer 42 seats in a shallow longitudinally extending recess 90 provided in the upper surface of lower clamp member 28 and has a depending cup-shaped retaining projection 92 formed centrally thereof which seats in an opening 94 provided centrally of the said clamp member 28. Insulator 38 is provided with a centrally disposed depending retaining projection 95 which extends into cup-shaped projection 92. The nut 96 provided at the lower end of bolt 58 extends into the central opening 97 provided in the web 80 and projection 95 of insulator 38. An opening 98 is also provided in the retaining projection 92 of lower insulator retainer 42 through which the lower end of bolt 58 may project upon compression of insulators 36 and 38 during operation of the vehicle. The head 58 and nut 96 of bolt 56 entering openings 60 and 97 respectively in stud 34 and insulator 38 locate the spring 12 in properly centered position in mounting structure 22.

Four clamp bolts 30 are employed which extend through aligned openings provided in lower clamp plate member 28 and in the lateral extensions 100, 100 provided on each of the upper clamp members 26. When the nuts 102 are tightened on bolts 30 the various elements hereinbefore described assume the positions shown in Figs. 2 and 3. When so assembled the rocker pad 32 is urged into resilient engagement with the web 44 of rocker seat 24. A lock nut 103 is provided on each bolt to prevent turning of nuts 102 due to vibration or other accidental causes. An opening 104 is provided in member 50 of rocker seat 24 to provide clearance for the upper end of the ball stud 34 during operation of the device.

It therefore is seen that my improved mounting structure 22 supports the spring 12 beneath the axle housing and provides a point of rocking action between the spring and housing as close to the top of the spring as is practical. The rounded bearing portions 62, 62 of upper clamp members 26, 26, permit the entire structure carried by clamp members 26, 26 and 28, including spring 12, to rock laterally of the vehicle against the cushioning action of rocker pad 32. Also, by virtue of the universal pivotal mounting provided by ball stud 34 and socket opening 54, spring 12 as a unit may rock relative to axle housing 18 with a minimum of torsional deformation. My improved mounting structure, it therefore is clear, permits this rocking action to take place without causing the axle housing to lose any of its lateral, fore and aft or torsional control. The axle housing 18 may thus operate through its many tramp movements with a minimum deformation of spring 12.

Lower clamp member 28 has welded or otherwise secured to the lower surface 106 thereof a supporting bracket 108. Bracket 108 has pivotally attached thereto, as shown at 110, the lower end of a shock absorber 112. The upper end of shock absorber 112 is attached in the usual fashion to side rail 10. Instead of mounting shock absorber 112 on bracket 108 it may be pivotally supported on axle housing 18, if it is so desired.

A bumper 114 constructed of hard rubber or of any other suitable material is mounted on a bracket 116 having arcuate side supporting arms 118 and 120 which straddle the upper side of axle housing 18 and extend over a portion of supporting member 50. Arms 118 and 120 are secured to supporting member 50 by welding. Bumper 114 is adapted to engage frame 10 and is provided to limit the relative movement of housing 18 and said frame.

Fig. 4 shows a slightly modified construction wherein a ball socket 200 is welded or otherwise secured to upper spring insulator retainer 40'. Socket 200 extends through an opening provided in the web 44' of rocker seat 24' and engages a ball stud 202 secured in any suitable fashion to the supporting member 50' associated with seat 24. The shank 204 of ball stud 202 extends through an opening 206 provided in supporting member 50' and the upper end thereof is spun over the tapered seat 208 provided in the supporting member 50' adjacent said opening. The upper end of shank 204 therefore lies substantially flush with the inner surface of member 50'. The opening in web member 44' is sufficiently large to permit rocking movement of socket 200 about ball stud 202. Socket 200 is provided with an opening 210 centrally thereof into which the head 58' of center spring retaining bolt 56' extends. The lower end of socket 200 lies in abutting relation with the upper surface of spring 12' when the parts are in assembled position, as shown in Fig. 4. The spring 12' and axle housing 18' shown in Fig. 4, accordingly, may rock relative to each other against the action of rocker pad 32' with a minimum of deformation of said spring.

Fig. 5 shows a further modification wherein the web 44" of rocker seat 24" has provided centrally thereof a ball socket 300 for receiving a ball stud 302. Ball stud 302 is formed centrally of and extends upwardly from upper spring insulator retainer 40". In this construction a disc 304 having an opening 306 extending vertically therethrough is welded or otherwise secured to retainer 40" directly beneath ball stud 302. The head 58" of spring retaining bolt 56" extends into the opening 306 of disc 304 and may move relative to said disc during operation of the device. The lower end of disc 304 lies in abutting relation with the upper surface of spring 12" when the parts are assembled, as shown in Fig. 5. It is seen that axle housing 18" and spring 12" may also rock relative to each other against the action of rocker pad 32" with a minimum of deformation of said spring.

From the foregoing description it is believed to be clear that the structures shown in Figs. 4 and 5, like that shown in Figs. 1 to 3, provide flexible and resilient connections between the associated springs and axle housings to which they are secured which reduce to a minimum the torsional deformation of said springs. The axle housings thus may operate through their many tramp variations of movement without imposing undue stresses on their associated suspension or load supporting springs. By my improved mounting means the spring is supported immediately beneath the axle housing with a point of rocking action between the spring and housing near the top of the said spring whereby such action may take place without causing the axle housing to lose any of its lateral, fore and aft or torsional control. As a result of these improved features the life of suspension springs not only is greatly increased but the ride quality of the vehicle is also enhanced.

The invention has been shown in connection with leaf springs of the multiple leaf type. It is apparent, however, that the invention is equally adapted for use with single leaf or springs constructed with fewer leaves than those illustrated.

Accordingly, while the embodiments herein shown and described are admirably adapted to fulfill the objects primarily stated it is to be understood that it is not intended to limit the invention thereto since it may be embodied in other forms, all coming within the scope of the claims which follow.

What is claimed is:

1. In a device of the class described, the combination of an axle housing, a leaf suspension spring, supporting means secured to said housing, and means for mounting said spring on said housing in such a manner as to permit said spring to rock relative to said housing, said last mentioned means including clamping means for attaching said spring to said supporting means, ball and socket connecting means between said spring and supporting means, and a resilient pad disposed between said spring and supporting means for resisting relative rocking movement of said spring and housing.

2. In a device of the class described, the combination of a vehicle frame, an axle housing, a leaf suspension spring, means for pivotally attaching the ends of said spring to said frame, and means for mounting said spring on said housing in such a manner that said spring may rock relative to said housing, said last mentioned means including clamping means, a ball and socket connection between said spring and housing, and resilient means disposed between said spring and housing for resisting the said relative movement thereof.

3. In a device of the class described, the combination of an axle housing, a multiple leaf spring, and means for mounting said spring on said housing in such a manner as to permit said spring to rock relative to said housing to prevent deformation thereof, said last mentioned means comprising, an extended supporting member secured to the underside of said housing having a ball socket therein, a ball stud mounted on said spring and engaging said socket, a resilient pad disposed between said spring and supporting member, and clamping means for securing said spring to said supporting member.

4. In a device of the class described, the combination of an axle housing, a multiple leaf spring, and means for mounting said spring on said housing in such a manner as to permit said spring to rock relative to said housing to prevent deformation thereof, said last mentioned means comprising, an extended supporting member secured to the underside of said housing having a ball socket therein, resilient insulating means engaging the upper and lower surfaces of said spring, upper and lower retaining means for said insulating means, a centering ball stud secured to the upper of said retaining means and engaging said socket, a resilient pad disposed between the said upper retaining means and said supporting member, and rockable clamping means engaging said supporting member and the lower of said retaining means for securing said parts in position and compressing said pad into resilient engagement with said supporting member.

5. In a device of the class described, the combination of an axle housing, a multiple leaf spring having upper and lower surfaces, a center retaining bolt for securing the leaves of said spring in position having a head at one end and a securing nut at the other end thereof, and mounting means for mounting said spring on said housing in such a manner as to permit said spring to rock relative to said housing to prevent deformation thereof, said last mentioned means comprising, a rocker seat secured to said housing and having a socket opening provided therein, resilient spring insulating means engaging said upper and lower surfaces of said spring, upper and lower retaining means for said insulating means, a centering ball stud having a vertically extending opening therein secured to said upper retaining means and extending into said socket opening, a shank on said stud engaging said spring, a resilient rocker pad disposed between said upper retaining means and said seat, the head of said bolt extending into the said opening in said ball stud to properly locate said spring on said mounting means, rockable clamping means for securing said parts in position, and said clamping means compressing said rocker pad into resilient engagement with said rocker seat.

6. In a device of the class described, the combination of an axle housing, a leaf spring, a supporting member secured to said housing having clamp seating means thereon, clamping means for securing said spring to said supporting member, and arcuate bearing means on said clamping means engaging the said seating means on said supporting member to provide a rockable connection therebetween.

7. In a device of the class described, the combination of an axle housing, a leaf spring, supporting means on said housing having arcuate clamp seating means thereon, rockable clamping means engaging said seating means for securing said spring to said supporting means, a ball and socket connection between said spring and said supporting means whereby said spring may rock relative to said housing with a minimum of deformation thereof, and a resilient pad disposed between said spring and supporting means for resisting rocking movement of said spring and clamping means.

8. In a device of the class described, the combination of an axle housing, a leaf spring, and means for mounting said spring on said housing in such a manner that said spring may rock relative to said housing, said last mentioned means including an extended supporting member secured to said housing, a ball stud secured to said supporting member, and a ball socket for said stud mounted on said spring.

9. In a device of the class described, the combination of an axle housing, a leaf spring, and means for mounting said spring on said housing in such a manner that said spring may rock relative to said housing, said last mentioned means including a housing supporting member secured to the underside of said housing, a ball stud secured to said supporting member, upper and lower resilient insulators for said spring, upper and lower retaining members for said insulators, a spring supporting member secured to said first mentioned supporting member having an opening therein, a ball socket for said stud secured to the upper of said retaining members and engaging said spring, said socket extending through the opening in said spring supporting member, and a resilient rocker pad disposed between said upper retaining member and said spring supporting member for resisting relative movement of said spring and housing.

10. In a device of the class described, the combination of an axle housing, a leaf spring, means for mounting said spring on said housing in such a manner that said spring may rock relative to said housing, said last mentioned means including an extended supporting member secured to said housing and having a ball socket formed therein, insulating means for said spring, a retaining member for said insulating means, and a ball head formed in said retaining means and engaging said socket.

11. In a device of the class described, the combination of an axle housing, a leaf spring, means for mounting said spring on said housing in such a manner that said spring may rock relative to said housing, said last mentioned means including an extended supporting member secured to said housing and having a ball socket formed therein, insulating means for said spring, a retaining member for said insulating means, a ball head formed in said retaining means and engaging said socket, and a resilient rocker pad disposed between said retaining and said supporting members for resisting relative movement of said spring and housing.

12. In a device of the class described, the combination of a vehicle frame, an axle housing, a leaf suspension spring, means for attaching the ends of said spring to said frame, a supporting member secured to the underside of said housing having clamp seating means thereon, and means for mounting said spring on said supporting member in such a manner that said spring may rock relative to said housing, said last mentioned means comprising clamping means for said spring, arcuate bearing means on said clamping means engaging the said clamp seating means on said supporting member adapting said clamping means for rocking movement thereon, a ball and socket connection between said spring and said supporting member, and resilient means disposed between said spring and supporting member.

13. In a device of the class described, the combination of a vehicle frame, an axle housing, a leaf suspension spring, means for attaching the ends of said spring to said frame, an extended rocker pad seat secured to the underside of said housing, and means for mounting said spring on said seat in such a manner that said spring and housing may rock relative to each other, said last mentioned means comprising clamping means consisting of upper and lower clamping members, rockable bearing means on said upper clamping members engaging said seat adapting said clamping means for rocking movement thereon, insulating means for said spring, upper and lower retainers for said insulating means, ball and socket connecting means between said spring and seat, a relatively extensive rocker pad disposed between said upper retainer and said seat to resist the rocking movements of said spring and clamping means, and bolt means for drawing said upper and lower clamping members toward each other to secure said spring and associated parts in position.

14. In a device of the class described, the combination of an axle housing, a leaf suspension spring, means for mounting said spring beneath said housing in such a manner that said spring may rock laterally relative to said housing without causing said housing to lose any of its lateral, fore and aft or torsional control, said last mentioned means including extended bearing means on said housing extending lengthwise of said spring, and pivotal means including a ball and socket joint disposed between the top of said spring and said bearing means.

15. In a device of the class described, the combination of an axle housing, a leaf suspension spring, means for mounting said spring beneath said housing in such a manner that said spring may rock laterally relative to said housing without causing said housing to lose any of its lateral, fore and aft or torsional control, said last mentioned means including extended bearing means on said housing extending lengthwise of said spring, pivotal means including a ball and socket joint between the top of said spring and said extended bearing means providing a point of rocking action therebetween near the top of said spring, and a resilient pad disposed between said bearing means and the top of said spring.

16. In a device of the class described, the combination of an axle housing, a leaf suspension spring, means for mounting said spring beneath said housing in such a manner that said spring may rock laterally relative to said housing without causing said housing to lose any of its lateral, fore and aft or torsional control, said last mentioned means including extended bearing means on said housing extending lengthwise of said spring, pivotal means including a ball and socket joint between the top of said spring and said extended bearing means providing a point of rocking action therebetween adjacent the top of said spring, a resilient pad disposed between said bearing means and the top of said spring, and rockable clamp means for securing said spring to said housing.

References Cited in the file of this patent

UNITED STATES PATENTS

| Number | Name | Date |
| --- | --- | --- |
| 613,803 | Knight | Nov. 8, 1898 |
| 1,480,633 | Pettegrew | Jan. 15, 1924 |
| 1,899,913 | McCuen | Feb. 28, 1933 |
| 2,280,347 | Olley et al. | Apr. 21, 1942 |